(12) United States Patent
Garraud et al.

(10) Patent No.: US 12,355,323 B2
(45) Date of Patent: Jul. 8, 2025

(54) ENERGY RECUPERATOR WITH WIDE RANGE OF OPERATING SPEED

(71) Applicant: COMMISSARIAT A L'ENERGIE ATOMIQUE ET AUX ENERGIES ALTERNATIVES, Paris (FR)

(72) Inventors: Nicolas Garraud, Grenoble (FR);
Sebastien Boisseau, Grenoble (FR);
Ghislain Despesse, Grenoble (FR);
Baptiste Alessandri, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 378 days.

(21) Appl. No.: 18/148,048

(22) Filed: Dec. 29, 2022

(65) Prior Publication Data
US 2023/0216390 A1 Jul. 6, 2023

(30) Foreign Application Priority Data

Dec. 30, 2021 (FR) ...................... 21 14675

(51) Int. Cl.
*H02K 35/02* (2006.01)
*H02K 7/18* (2006.01)
(Continued)

(52) U.S. Cl.
CPC .................... *H02K 35/02* (2013.01)

(58) Field of Classification Search
CPC .......... H02K 35/02; H02K 35/00; H02K 7/06; H02K 7/00; H02K 7/18; H02K 7/1807;
(Continued)

(56) References Cited

U.S. PATENT DOCUMENTS 7,191,861 B2 * 3/2007 Bui .................... B62M 6/40
280/212
9,236,761 B2 * 1/2016 Strothmann ............ H02J 7/345
(Continued)

FOREIGN PATENT DOCUMENTS

FR        3 093 874 A1    9/2020
IT   MI 20111995 A1       5/2013
(Continued)

OTHER PUBLICATIONS

French Preliminary Search Report issued Nov. 14, 2022 in French Application 21 14675, filed on Dec. 30, 2021 (with English Translation of Categories of cited documents and Written Opinion), citing documents 1-3 & 15-18 (14 pages).

*Primary Examiner* — Edgardo San Martin
(74) *Attorney, Agent, or Firm* — Oblon, McClelland, Maier & Neustadt, L.L.P.

(57) ABSTRACT

An energy recovery device including at least one first magnet, able to be set in movement according to a rotational or translational movement; a main magnet, able to be set in rotation about an axis by said at least first magnet; at least one second magnet, fixedly disposed with respect to the main magnet, for determining one or more positions of equilibrium of the latter; at least one conductive coil for transforming a variation of orientation of the main magnet into electrical energy, wherein in a 1st speed or frequency range a coupling of said at least one first magnet and of said main magnet causes the rotation of the latter from at least one position of equilibrium, the oscillations of said main magnet around said at least one position of equilibrium resulting in the creation of an electrical energy in said at least one conductive coil; and for a 2nd speed or frequency range a coupling of said at least one first magnet and of said main magnet causes the rotation of the latter, without oscillations, (Continued)

and this rotation results in the creation of an electrical energy in the coil.

20 Claims, 5 Drawing Sheets

(51) Int. Cl.
    *H02K 21/12*     (2006.01)
    *H02K 21/24*     (2006.01)

(58) Field of Classification Search
    CPC .... H02K 7/1853; H02K 7/1892; H02K 21/24; H02K 21/12; H02K 21/14; H02K 1/143; H02K 1/2726
    See application file for complete search history.

(56) References Cited

U.S. PATENT DOCUMENTS

| | | | |
|---|---|---|---|
| 10,033,249 B2 * | 7/2018 | Liao | H02K 49/102 |
| 11,101,725 B2 * | 8/2021 | Flankl | H02K 7/1846 |
| 11,114,926 B2 * | 9/2021 | Delette | H02K 35/02 |
| 11,251,007 B2 * | 2/2022 | Deak, Sr. | H02K 35/02 |
| 11,915,898 B2 * | 2/2024 | Deak, Sr. | H02K 7/1876 |
| 2010/0194117 A1 * | 8/2010 | Pabon | H02K 35/02 290/1 R |
| 2010/0264781 A1 * | 10/2010 | Pedersen | B62J 6/20 310/67 R |
| 2012/0176005 A1 | 7/2012 | Pedersen | |
| 2014/0246961 A1 * | 9/2014 | Smith | H02K 49/106 310/75 R |
| 2018/0159417 A1 | 6/2018 | Flankl et al. | |
| 2022/0294324 A1 | 9/2022 | Boisseau et al. | |

FOREIGN PATENT DOCUMENTS

| | | |
|---|---|---|
| WO | WO 01/33700 A1 | 5/2001 |
| WO | WO 2013/035057 A2 | 3/2013 |

* cited by examiner

ENERGY RECUPERATOR WITH WIDE RANGE OF OPERATING SPEED

TECHNICAL FIELD AND PRIOR ART

The present invention relates to an electromagnetic energy recovery system able to convert a rotational or translational movement of a movable element relative to a fixed element into electrical energy.

An advantage of this system is its capability of converting this movement efficiently over a wide range of rotational (typically from 1 revolution/day to 10,000 revolutions/s) or movement speeds of the movable element. For example, the electrical energy into which the movement is converted may be used afterwards to remotely transmit a piece of information using a microcontroller and a RF chip.

This device may be implemented in any system having significant rotational or movement speed ranges, for example dimmer-switches, handles, rotating shafts, turbines, industrial machines, robots, agricultural machines, . . . .

There are few known energy recovery systems capable of operating over several ranges of rotational or movement speeds.

The device described in EP 3488517 for a standalone switch is known. A main magnet of the device described in this document is actuated by actuator magnets which are disposed in lateral slides and which follow a translational movement. Hence, the movement and the speed of these actuator magnets are limited.

The problem of finding a device allowing recovering energy from a rotational or translational movement of a movable element arises.

Preferably, this energy recovery is possible for quite wide speed ranges of the movable element.

DISCLOSURE OF THE INVENTION

The invention first relates to an energy recovery device including:
  a)—first magnetic means (for example at least one first magnet), or magnetic drive means, able to be set in movement according to a rotational or translational movement; these first magnetic means preferably include a permanent magnet;
  b)—a main magnet, able to be set in rotation about an axis by the first magnetic means;
  c)—second magnetic means (for example at least one second magnet), fixedly disposed with respect to the main magnet, for determining one or more position(s) of equilibrium of the latter;
  d)—means, including for example at least one conductive coil, for transforming a flux variation due to the movement of the main magnet or of the first magnetic means into electrical energy.
  For example:
    in a 1st speed or frequency range, called low range, for example less than 120 tr/mn or 500 tr/mn, a coupling of said at least one first magnet and of said main magnet causes the rotation of the latter from at least one position of equilibrium, the oscillations of said main magnet around said at least one position of equilibrium resulting in the creation of an electrical energy in said at least one conductive coil;
    for a 2nd speed or frequency range, called mid-range, for example comprised between 100 tr/mn or 120 tr/mn or 500 tr/mn and 5000 tr/mn or 7000 tr/mn or 10000 tr/mn, a coupling of said at least one first magnet and of said main magnet causes the rotation of the latter, without oscillations, and this rotation results in the creation of an electrical energy in the coil.

The invention also relates to an energy recovery method, which can implement for example a device according to the invention, as described hereinabove and/or in the context of the present application.

The invention also relates to such an energy recovery method including:
  a)—setting first magnetic means (for example at least one first magnet), or drive means, in movement according to a rotational or translational movement, at a first speed or frequency or at a speed or frequency in a 1st range of speeds or frequencies;
  b)—setting a main magnet in rotation about an axis (ZZ') by the first magnetic means, starting from at least one position of equilibrium of the main magnet, defined by second magnetic means (for example at least one second magnet), fixedly disposed with respect to the latter;
  c)—the transformation of a magnetic flux variation, for example due to a variation of orientation of the main magnet, into electrical energy by at least one conductive coil.

In such a method or device, the main magnet can oscillate around one or more position(s) of equilibrium, and the variation of orientation due to these oscillations can be converted into electrical energy by said conductive coil.

This is the case for example when the first magnetic means are driven in rotation at a low speed, for example lower than 120 rpm or 500 rpm.

A second operating mode can be established when the first magnetic means are driven in rotation at a second speed or frequency or at a speed or frequency in a 2nd range of speeds or frequencies, for example comprised between 100 rpm or 120 rpm or 500 rpm and 5,000 rpm or 7,000 rpm or even 10,000 rpm. In this second mode, the main magnet no longer necessarily oscillates around its positions of equilibrium and follows the first magnetic means synchronously.

In other words:
  in a 1st speed or frequency range, called low range, for example less than 120 tr/mn or 500 tr/mn, a coupling of said at least one first magnet and of said main magnet causes the rotation of the latter from at least one position of equilibrium, the oscillations of said main magnet around said at least one position of equilibrium resulting in the creation of an electrical energy in said at least one conductive coil;
  for a 2nd speed or frequency range, called mid-range, for example comprised between 100 tr/mn or 120 tr/mn or 500 tr/mn and 5000 tr/mn or 7000 tr/mn or 10000 tr/mn, a coupling of said at least one first magnet and of said main magnet causes the rotation of the latter, without oscillations, and this rotation results in the creation of an electrical energy in the coil.

An energy recovery method according to the invention may further include:
  a step of setting first magnetic means, or drive means, in movement at a third speed or frequency, or at a speed or frequency in a 3rd range of speeds or frequencies, for which the main magnet is not set in rotation;
  the transformation of this movement of the first magnetic means into electrical energy by at least one conductive coil.

For example, this mode can be implemented when the first magnetic means are driven in rotation at a speed higher than 5,000 rpm or 10,000 rpm.

An energy recovery device or method according to the invention may be applied to a movable element, the invention allowing converting a rotational or translational movement of this movable element relative to a fixed element into electrical energy. The first magnetic means, which are means for driving the main magnet, are linked to this movable element.

In a device or a method according to the invention, the first magnetic drive means may be movable:
- in rotation about an axis, for example about the axis (ZZ') of rotation of the main magnet;
- or in translation, for example entirely or at least partially according to a direction, or in a plane, perpendicular to the axis ZZ' of rotation of the main magnet and/or the first magnetic drive means being polarised according to the axis ZZ' and being movable in translation along the axis ZZ'; in this case, according to a particular embodiment, the first magnetic drive means may include a plurality of magnets disposed in line with successively opposite polarities;
- or in rotation or in translation at least in part in a plane containing the main magnet. In a device or a method according to the invention, the second magnetic means fixedly disposed with respect to the main magnet may include at least one ferromagnetic circuit, said position(s) of equilibrium being defined when the main magnet closes this ferromagnetic circuit. For example, such a device may include at least 2 ferromagnetic circuits, a position of equilibrium being defined when the main magnet closes each ferromagnetic circuit.

Irrespective of the embodiment of a device or a method according to the invention:
- in order to recover the electrical energy, at least one conductive coil may be wound around the main magnet or at least one portion of the magnetic circuit;
- and/or the magnetic means for fixing one or more position(s) of equilibrium of the main magnet may further include at least one fixed magnet interacting with the main magnet;
- and/or at least one amongst the magnetic drive means and the main magnet may be bipolar or n-polar (n>2).

In a device or a method according to the invention, the first magnetic means and/or the main magnet may have an axisymmetry around an axis of symmetry, for example the axis around which the main magnet is driven in rotation.

In a device or a method according to the invention, it is possible to implement several conductive coils for transforming a variation of orientation of the main magnet into electrical energy.

The invention allows making an energy recovery system with a wide range of operating speeds. It allows recovering energy at very low speeds or frequencies of the first magnetic means of the means linked to the movable element.

A device implemented in the context of the present invention is significantly non-linear with storage of energy in the magnetic form (in particular for the 1st frequency or speed range); it may include one or more trigger point(s) and the energy may be released in the form of oscillations.

The device or the method according to the invention implements a magnetic circuit able to collect a flux variation related to both the movement of the driven magnet and the movement of the driver magnet(s). For example, at low drive speed, the driven magnet is able to store energy in the magnetic form, then release it suddenly by oscillation that is quick in comparison with the speed of movement of the driver magnet.

BRIEF DESCRIPTION OF THE DRAWINGS

Embodiments of the invention will now be described with reference to the appended drawings wherein.

In the figures, similar or identical technical elements bear the same reference numerals.

DETAILED DISCLOSURE OF PARTICULAR EMBODIMENTS

Figure 1:
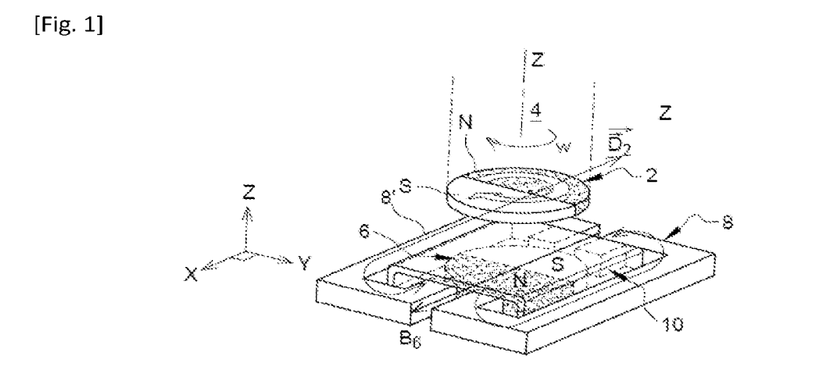
FIG. 1 represents an embodiment of a device according to the invention.

An embodiment of a device according to the invention is illustrated in FIG. 1. It includes:
- a driver magnet 2, secured to an element 4 movable in rotation, for example a shaft of a machine, which can rotate about an axis ZZ' substantially perpendicular to the plane (itself parallel to the plane XY) in which this magnet 2 can be driven in rotation; this magnet 2 may feature an axisymmetry around ZZ' or around an axis that is parallel to ZZ', but a magnet with another shape, for example parallelepiped, is also possible; the magnetic polarisation $B_2$ of the magnet 2 is located in a plane parallel to the plane XY;
- a central or main magnet 6, which extends in a plane parallel to that of the magnet 2; by coupling, the latter drives the magnet 6 in rotation about the axis ZZ'; this magnet 6 is preferably axisymmetric around ZZ'; in turn, its polarisation $B_6$ is also located in a plane parallel to the plane XY;
- 2 magnetic elements 8, 8', each in the form of a ferromagnetic circuit, having an air gap into which the central magnet 6 is inserted; each magnetic element allows channeling the magnetic flux lines of the central magnet 6; as shown in FIG. 1, these two magnetic elements may be disposed symmetrically with respect to a plane XZ; The elements 8, 8' are polarised thanks to the magnet, and their magnetisations can be easily reversed. The positions of equilibrium lie on a minimum magnetic energy between the magnet and the elements 8, 8';
- a coil 10 that allows converting into electrical energy the variation of magnetic flux induced by the rotation of the central magnet 6; like in the embodiment illustrated in FIG. 1, this coil is preferably disposed around the central magnet 6.

Figure 2:
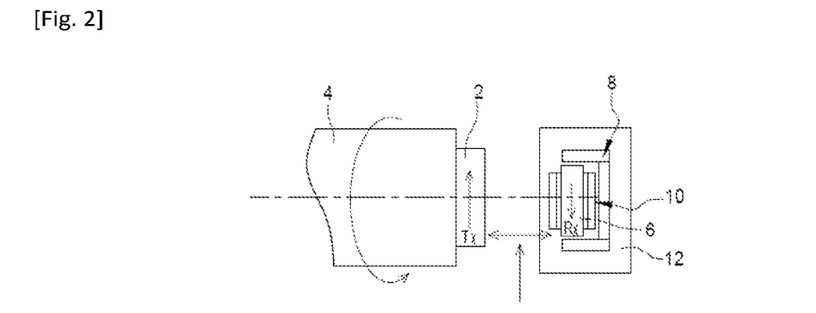
FIG. 2 represents a side view of the embodiment of FIG. 1.

FIG. 2 represents a side view of this system, which forms an energy recuperator. In this figure, the case 12, in which the set including the central magnet 6, the magnetic elements 8, 8' and the coil 10 is disposed, is also represented. In general, irrespective of the embodiment, mechanical holding means hold the magnet 6 in the coil 10; it is for example guided on plain bearings or roller bearings (in order to reduce frictions and increase the stall frequency). As regards the case 12, a ferromagnetic material is to be avoided; the latter is preferably made of a non-metallic material (in particular for high frequencies, in order not to induce eddy currents), for example of the plastic or ceramic type.

In the embodiment illustrated in FIGS. 1 and 2, an electrodynamic coupling is established between the magnet 2 and the magnet 6, the rotation of the magnet 2 causing that of the magnet 6 in its plane. More exactly, coupling between the magnet 2 and the magnet 6 is established in the form of a torque between these 2 magnets. When their polarisations are anti-parallel, then the torque is zero. When the magnet 2 rotates, the magnet 6 will have a tendency to rotate to align. Moreover, if the magnet 6 is not free to rotate (for example because of the presence of the ferromagnetic circuit), then a position of equilibrium that does not comply with the alignment of the polarisations of the magnets 2 and 6 is found. In this case, there is storage of energy in the magnetic form. We should also note that coupling increases when the distance between the magnets decreases, or when the dimension of the magnets increases; advantageously, the distance between the two magnets is smaller than 3 times the length of the magnets, and is preferably smaller than 1 time the length of the magnets.

Moreover, the magnet 6 has 2 stable positions of equilibrium, determined by the closure of the 2 circuits formed by the two magnetic elements 8, 8'. Hence, in general (except for very high speeds, as explained hereinbelow), the rotation of the magnet 2 will make the magnet 6 switch from a stable position of equilibrium (this position is that represented in FIG. 2), into another stable position of equilibrium, etc.

An energy recovery system such as that of FIGS. 1 and 2 can have 3 operating modes depending on the rotational speed of the driver magnet 2:

for a 1st speed range, called low-speed range, coupling of the magnets 2 and 6 causes the rotation of the latter from one position of equilibrium to another; the oscillations of the central magnet 6 around each of these positions of equilibrium result in the creation of an electrical energy in the coil 10;

for a 2nd speed range, called mid-speed range, herein again, coupling of the magnets 2 and 6 causes the rotation of the latter and this rotation results in the creation of an electrical energy in the coil 10 (the magnet 6 has no time to start oscillating);

for a 3rd speed range, called high-speed range, the magnet 6 no longer rotates, the driver magnet 2 interacts directly with the circuit 8 and the variations of magnetic field induced in the latter are converted into electric power by the coil 10.

For these different cases, the electrical energy could be stored, for example in storage means such as one or more batter(y/ies) or one or more capacitor(s) or one or more supercapacitor(s) and/or used to power any electrical system, for example to make a measurement, process it and remotely transmit it using a microcontroller and a RF chip. Details of these 3 operating modes are given hereinbelow.

The limits of the 3 speed ranges hereinabove will depend on the sizing of the main magnet 6 and of the coupling between the two magnets 2, 6.

According to one example:

a low-speed operating mode is established for a rotational speed $\omega$ lower than a few tens of rpms, for example lower than 120 rpm (2 Hz);

a mid-speed operating mode is established for a rotational speed $\omega$ comprised between a few tens of rpms and a few thousands of rpms, for example between 100 or 120 rpm on the one hand and 5,000 or 10,000 rpm on the other hand;

a high-speed operating mode is established for a rotational speed $\omega$ higher than a few thousands of rpms, for example higher than 5,000 rpm or else higher than 10,000 rpm.

In a more detailed manner, in the low-speed operating mode (for example $\omega$<120 tr/min), the central magnet 6 is subjected to a magnetic torque ($\tau_{mag}$) induced by the rotating driver magnet 2 as well as by a second magnetic torque related to the ferromagnetic circuits 8, 8' ($\tau_{fer}$). The presence of these ferromagnetic circuits induces positions of equilibrium of the magnet 6 corresponding to energy sinks. When the driver magnet 2 starts rotating:

as long as $\tau_{mag} \leq \tau_{fer\_seuil}$, $\tau_{fer\_seuil}$ being the torque needed to cross the energy barrier of the sink, the central magnet 6 remains blocked on its $1^{st}$ position of equilibrium, for example that illustrated in FIG. 2; the energy related to the torque $\tau_{mag}$ is stored in the magnetic form;

when $\tau_{mag} \geq \tau_{fer\_seuil}$ the energy recovery device is triggered and the energy stored in the magnetic form is released in the form of oscillations of the central magnet around its $2^{nd}$ position of equilibrium. These mechanical oscillations of the central magnet are converted into electrical energy by the coil 10, which converts the variation of magnetic flux into electromotive force (e=d$\phi$/dt). In the case of low speeds, a frequency-up conversion phenomenon is observed, which allows recovering energy efficiently; this frequency-up conversion phenomenon is due on the one hand to the highest frequency of the oscillations around each position of equilibrium, in comparison with the rotation of the driver magnet 2 and, on the other hand, to quite different characteristic times involved (on the one hand, the short time of the passage of the magnet 6 from one position of equilibrium to another and, on the other hand, the longer time of the rotation of the magnet 2);

the driver magnet 2 continues its rotational movement, and herein again, we have the inequality: $\tau_{mag} < \tau_{fer\_seuil}$; the central magnet 6 therefore remains blocked on its $2^{eme}$ position of equilibrium;

when, again, $\tau_{mag} > \tau_{fer\_seuil}$, the magnet 6 leaves its $2^{nde}$ position of equilibrium: the energy recovery device is triggered again and returns back to its $1^{st}$ position of equilibrium (that illustrated in FIG. 2), and the energy stored in the magnetic form is released again in the form of mechanical oscillations around this $1^{st}$ position of equilibrium and converted into electric power by the coil 10, with a rise of the frequency as explained hereinabove.

This cycle can be repeated with the rotation of the device 4. As one could understand from the explanations hereinabove, the behaviour of the system, with its 2 positions of equilibrium and triggering of the movement with a release of energy, first stored in the magnetic form, in the form of mechanical oscillations around the positions of equilibrium, allows recovering energy at very low rotational speeds of the driver magnet 2.

At middle speeds (forex e 120 tr/min<ω<10000, the central magnet 6 has no time to start oscillating around each of its positions of equilibrium. It is driven in rotation at the same speed or frequency as the driver magnet 2, the whole forming a magnetic gear. In this case, the actuation frequency of the driver magnet 2 is enough for the rotational movement of the central magnet 6 to be directly converted into electric power by the coil 10.

At high speeds (for example ω>30000 tr/min), the central magnet 6 "stalls" and remains blocked: it no longer rotates. However, the high-frequency magnetic field induced by the driver magnet 2 is collected directly by the ferromagnetic circuit 8 and converted into electric power by the coil 10. In this case, the flux variations in the coil 10 are lower than is the case if they were due to a rotation of the magnet 6 (because there is 1 distance between the driver magnet 2 and the coil 10); the latter is compensated by a higher frequency of flux variation which allows extracting a usable energy.

Thus, the energy recovery system according to the invention is capable of generating power regardless of the rotational speed of the driver magnet 2, both at low and at high rotational speeds. In practice, depending on the applications, it is possible to use only 2 speed ranges, for example either a rotation at low speed than at middle speed or a rotation at middle speed then at high speed.

For example, in a device or a method according to the invention:
in a 1st speed or frequency range, called low range, for example less than 120 tr/mn or 500 tr/mn, a coupling of said at least one first magnet and of said main magnet causes the rotation of the latter from at least one position of equilibrium, the oscillations of said main magnet around said at least one position of equilibrium resulting in the creation of an electrical energy in said at least one conductive coil;
for a 2nd speed or frequency range, called mid-range, for example comprised between 100 tr/mn or 120 tr/mn or 500 tr/mn and 5000 tr/mn or 7000 tr/mn or 10000 tr/mn, a coupling of said at least one first magnet and of said main magnet causes the rotation of the latter, without oscillations, and this rotation results in the creation of an electrical energy in the coil.

In a further embodiment, in a 3rd speed or frequency range, called high range, the main magnet no longer rotates, said at least one first magnet interacting directly with the at least one conductive coil, the variations of magnetic field induced in the latter being converted into electric power by the at least one conductive coil.

According to an embodiment of a device such as that of FIGS. 1 and 2, it is possible to have the following dimensions and parameters:
central magnet 6 made of NdFeB, with the dimensions 8.2 mm (diameter)×2.1 mm;
coil 10 made of copper, having 1,000 turns and 1 mm thick;
ferromagnetic circuit 8 made of Iron-Silicon 2 mm thick;
driver magnet 2 1 cm thick and with a diameter of 3 cm; it is located at a few centimetres from the generator (for example the distance between the driver magnet 2 and the central magnet 6 is comprised between 1 cm and 4 cm).

Figure 3:
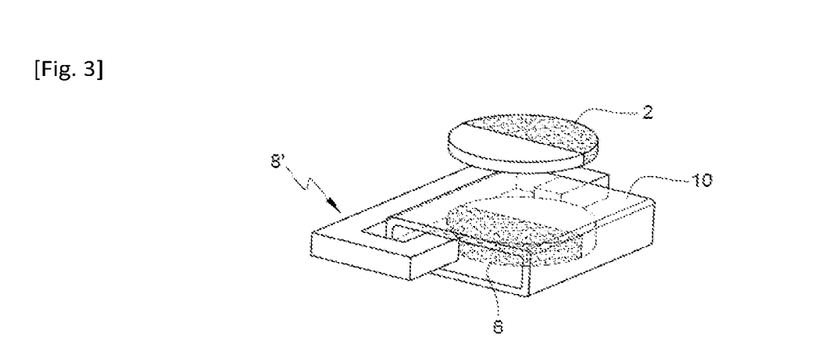
FIG. 3 represents a variant of a device according to the invention, with a simple magnetic circuit.

The dimensions hereinabove are given for merely indicative purposes. It is possible to consider a system having different dimensions, in particular for integration in a MEMS. In one variant, illustrated in FIG. 3, the double ferromagnetic circuit 8, 8' of FIG. 1 and of FIG. 2 is replaced by a simple ferromagnetic circuit 18. The operation is similar to that described hereinabove (herein again, we have 2 stable positions of equilibrium, each corresponding to an alignment of the polarisation with the branches of the circuit).

Figure 4A:
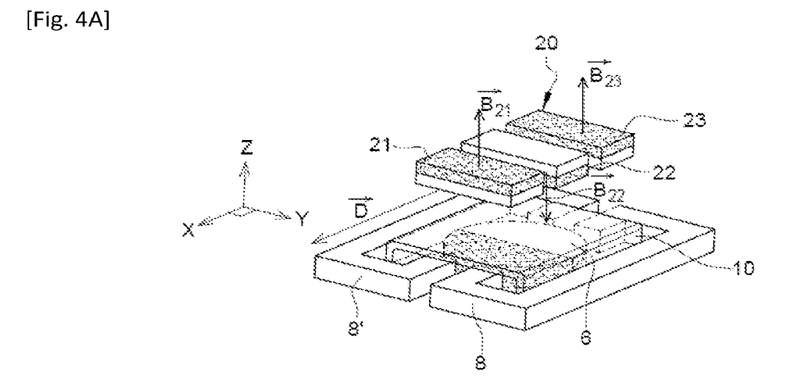
FIG. 4A-FIG. 4C represent another variant of a device according to the invention, with translational movement drive means.

In another embodiment, illustrated in FIG. 4A, the magnetic drive means 20 includes a series of magnets 21, 22, 23 disposed according to a direction D, for example parallel to the axis X of FIG. 4A, but whose polarisations, $B_{21}$, $B_{22}$, $B_{23}$ parallel to the axis Z are alternately oriented along the axis X. In other words, each magnet has a magnetisation oriented according to Z but opposite to that of its neighbour(s); the magnets are held by holding means (not represented in the figure), for example by a slide or over a base, which can be driven in translation, for example according to the direction D parallel to the axis X. Alternatively, the magnetic drive means 20 include one single magnet 21 or 22 whose polarisation $B_{21}$ or $B_{22}$, is parallel to the axis Z. Hence, in this embodiment, the rotary driver magnet of FIG. 2 is replaced:
by a magnet 21, 22 whose polarisation $B_{21}$ or $B_{22}$, is parallel to the axis Z;
or by the series of magnets 21-23 with magnetisations $B_{21}$, $B_{22}$, $B_{23}$ parallel to the axis Z but alternately oriented.

Figure 8:
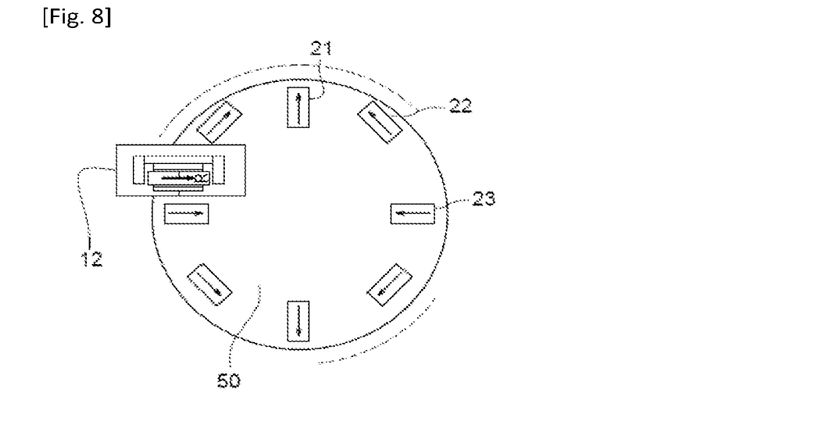
FIG. 8 illustrates an embodiment according to the invention with a rotating shaft whose circumference is provided with magnets.

For example, the driving movement can be generated by a motor-driven axis or a sliding door (not represented in the figure), in translation along the direction D parallel to the plane XY, for example according to a back-and-forth movement, and perpendicular to the magnetisations $B_{21}$, $B_{22}$, $B_{23}$. In one variant, represented in FIG. 8, the magnets 21-23 may be hooked over the circumference of a rotating shaft 50, similar to a multipolar driver magnet. In this case, when it is the closest to the central element 6, each magnet is disposed parallel to the latter before being brought away therefrom by the rotational movement. In FIG. 8, the energy recuperator 12 placed opposite the rotor is also represented. In this FIG. 8, the magnets are disposed at the tip of the shaft or of the cylinder; alternatively, the magnets may be located at a given position along the shaft or the cylinder, i.e. over the external surface of the shaft or of the cylinder. In this case, the magnets are disposed over a curved surface which wraps around the shaft or the cylinder, i.e. outside the perimeter of the shaft or of the cylinder.

Figure 4B:
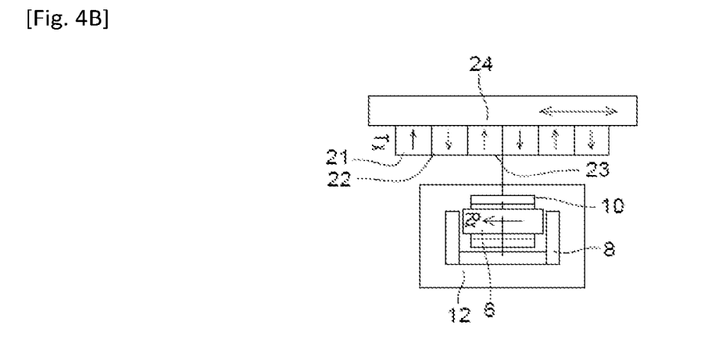

FIG. 4B represents the embodiment of FIG. 4A in side view, the magnets 21-23 . . . being fastened to a base 24 which moves in translation according to a back-and-forth movement.

Alternatively, the driver magnets 21-23 are alternately polarised:
according to a direction in a plane parallel to the plane XY, but perpendicular to the direction D of movement of the magnets (cf. FIG. 4C);
or else according to a direction in a plane parallel to the plane XY and parallel to the direction D of movement of the magnets (a case not represented in the figures);
or else according to another direction, for example in diagonal with respect to the previous 2 directions.

Figure 4C:
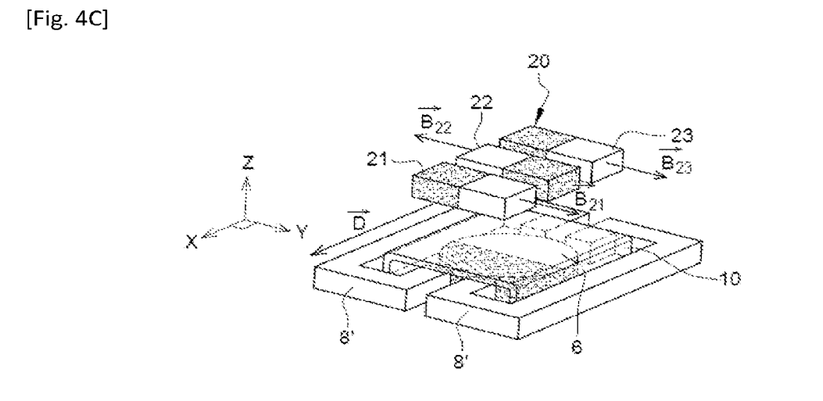

In these different cases, the magnetic circuit 8, 8' is preferably oriented according to the direction of the polarisation of the magnets 21-23 to collect a variation of induction directly induced by the high-speed driver magnets. In the case of the translational movement, we have, herein again the three speed modes that have been disclosed hereinabove.

In the embodiments described hereinabove in connection with FIG. 4A, FIG. 4B and FIG. 4C, other movements of the magnetic drive means 20 are possible (in the three directions X, Y, Z) by adapting the energy recovery system accordingly.

In the embodiments described hereinabove, the magnetic drive means and the central element are disposed in parallel planes, located at a given distance from each other. In one variant, not represented in the figures, whether for the embodiment of FIG. 2, of FIG. 3 or of FIG. 4A to FIG. 4C, the magnet 2 of the rotating configurations or the magnets 21-23 may be located in the same plane as the central magnet 6 and be driven in rotation or in translation in this plane.

Figure 5:
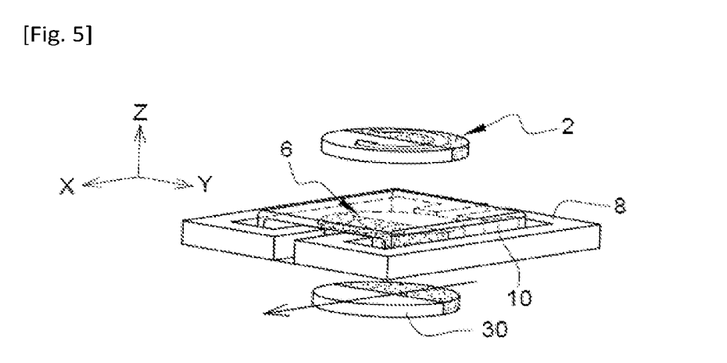
FIG. 5 represents still another variant of a device according to the invention, with magnetic means for adjusting a trigger point.

Another embodiment is illustrated in FIG. 5: a magnet 30 is placed under the generator to adjust the trigger or toggle point of the system. It has a magnetisation directed in a plane parallel to the plane XY; it may have a specific angle in this plane: depending on its orientation in this plane, the magnet 30 will more or less interact with the magnet 6 and make triggering of toggling of the latter vary, by the effect of the driver element 2, from one stable position to another. This is also applicable to the case of the linear movement of FIG. 4A to FIG. 4C. This magnet 30 may be much smaller than the magnet 6, and/or located on the side of the device. A setting may be done by rotating it and/or by translating it.

In general, regardless of the embodiment of the invention, the interaction of the driven magnet 6 with the magnetic circuit 8 acts as an elastic connection or a spring. The characteristic of this connection can be controlled by sizing the portions of the system; alternatively to this sizing, or in combination with the latter, it is possible to add an additional "spring" element, for example, as has just been mentioned, the additional setting magnet 30, to reach the desired characteristic. This allows properly positioning the point of equilibrium of the forces, in particular the trigger angle, as well as the oscillation frequency, in particular for the low-speed mode. Alternatively, the magnet 30 may be located in the same plane as the magnet 6.

Such an additional magnet 30 can be used in all of the above-described embodiments. According to still another embodiment, schematically illustrated in FIG. 6, a coil 40 is added around the magnetic circuit 8, 8'. This coil 40 may be the only one present, excluding the coil 10.

Figure 6:
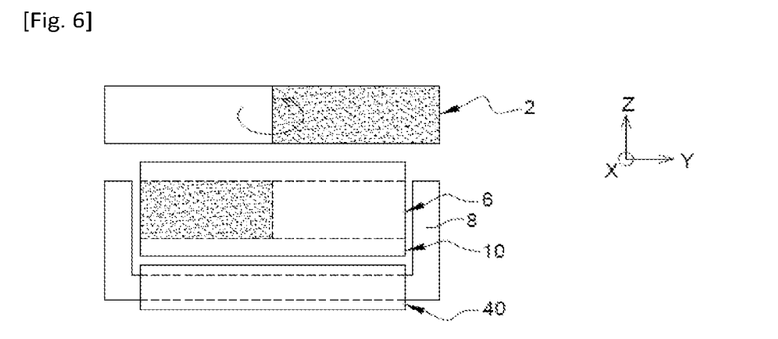
FIG. 6 represents still another variant of a device according to the invention, with a winding on the magnetic circuit.

As explained hereinabove:
at low to medium speed, the magnet 6 oscillates or rotates with the driver magnet 2, in this case, the coil 10 and/or the coil 40 recovers energy on the rotation of the driven magnet;
at high speed, the magnet 6 no longer moves, but the driver magnet 2 induces a variation of magnetic flux directly in the magnetic circuit 8, 8', which variation is transformed into electrical energy via the coil 40.

The coil 10 and/or the coil 40 may be connected in series according to a polarity that allows obtaining an addition of voltages.

According to one embodiment, only the coil 40 is present, even though this is slightly less efficient at low voltage (because of magnetic losses on the ferromagnetic material and since some field lines vanish in the air).

Herein again, this embodiment can be combined with all of the above-described embodiments.

Figure 7A:
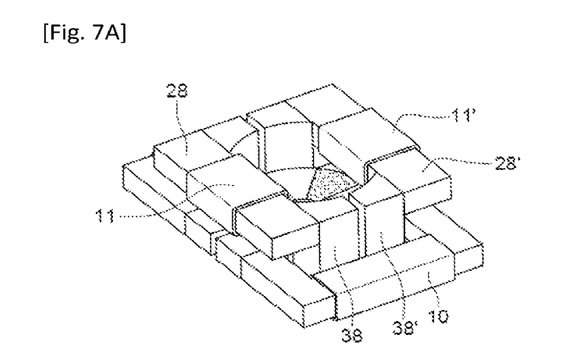
FIG. 7A-FIG. 7B represent still another variant of a device according to the invention, with a multipolar magnet.
Figure 7B:
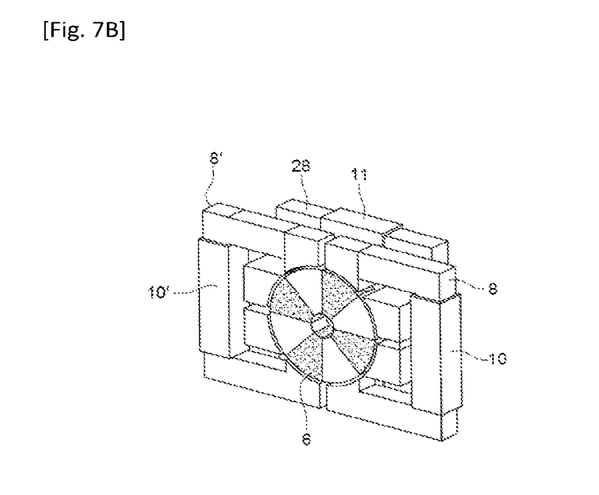

Still another embodiment is illustrated in FIG. 7A and in FIG. 7B, wherein the driver magnet 2 and/or the central magnet 6 are no longer bipolar but multipolar (or n-polar, with n an even number and n>2; it should be noted that, in this embodiment, the driver magnet 2 and the central magnet 6 do not necessarily have the same number of poles). These figures represent the case of an octopolar magnet: this configuration allows exploiting 8 flux variation throughout a rotation of the driver magnet (versus 2 variations for the structure of FIG. 2); over a rotation of the magnet 6, there are 8 positions of equilibrium. This allows best exploiting the entire rotation of the central magnet, in particular at very low speeds.

A portion of the ferromagnetic circuit can then be disposed outside the main plane (in which the magnet 6 rotates), by studs 38, 38' which allow defining other branches 28, 28' of the circuit which cooperate with additional polarities of the central magnet 6. Each of these branches is associated to a position of equilibrium of the latter. It should be noted that a bipolar magnet would also have 8 positions of equilibrium thanks to the branches; 1 octopolar magnet, with only 1 of these ferromagnetic circuits, would also have 8 positions of equilibrium per rotation.

A coil 10, 10', 11, 11' may be placed around each branch of the ferromagnetic circuit. It is possible to have a different number of coils, other than one coil per branch of the circuit. Herein again, these coils allow detecting a variation of the magnetic flux and transforming this variation into electrical energy, whether the rotational movement of the magnet 6 is driven by a rotation or a translation. This configuration allows generating energy each $\frac{1}{8}^{th}$ turn of the driver magnet, in contrast with the configuration of FIG. 1, for example, which requires a half-turn as of entry of the driver magnet.

In all of the embodiments of the invention, the electrical energy recovered in the coil 10 and/or the coil 40 can be stored, for example in storage means such as one or more batter(y/ies) or one or more capacitor(s) or one or more supercapacitor(s) and/or used to power any electrical system, for example to remotely transmit a piece of information using a microcontroller and a RF chip and/or for one of the numerous applications of the invention, for example:
  making a dimmer-switch, or a door leaf (doors or windows) opening/closure detector; in general the invention can apply to all home automation application;
  powering standalone sensors for rotating shafts or standalone magnetic encoder;
  making a position sensor for industrial machines or robots, or for agricultural machines . . .
  making a presence sensor, for example for the detection of the presence of a package or any other part: in this application, it consists of an operation based on gravity wherein the object will be set over a surface integrating the invention. The object bears on the surface which moves a translational driver magnet.

The invention has been described with magnetic means that are set in movement relative to a set which forms energy recovery means. Alternatively, the first magnetic means may be fixed and the recovery means may be linked to a movable element.

The invention claimed is:
1. An energy recovery device including:
  a)—at least one first magnet, able to be set in movement according to a rotational or translational movement;
  b)—a main magnet, able to be set in rotation about an axis (ZZ') by said at least first magnet;
  c)—at least one second magnet, fixedly disposed with respect to the main magnet, for determining one or more position(s) of equilibrium of the latter;
  d)—at least one conductive coil for transforming a variation of orientation of the main magnet into electrical energy, wherein:
    in a 1st speed or frequency range, called low range, a coupling of said at least one first magnet and of said main magnet causes the rotation of the latter from at least one position of equilibrium, the oscillations of said main magnet around said at least one position of equilibrium resulting in the creation of an electrical energy in said at least one conductive coil;

for a 2nd speed or frequency range, called mid-range, a coupling of said at least one first magnet and of said main magnet causes the rotation of the latter, without oscillations, and this rotation results in the creation of an electrical energy in the coil.

2. The device according to claim 1, wherein the at least one first magnet is movable in rotation about the axis (ZZ') of rotation of the main magnet.

3. The device according to claim 1, wherein the at least one first magnet is movable in translation at least in part in a plane perpendicular to the axis (ZZ') of rotation of the main magnet.

4. The device according to claim 1, wherein the at least one first magnet is polarised according to said axis (ZZ') and is movable in translation along said axis.

5. The device according to claim 3, wherein the at least one first magnet includes a plurality of magnets disposed in line with successively opposite polarities.

6. The device according to claim 1, wherein the at least one first magnet is movable in rotation or in translation at least in part in a plane containing the main magnet.

7. The device according to claim 1, wherein the at least one second magnet is fixedly disposed with respect to the main magnet, including at least one ferromagnetic circuit, said position(s) of equilibrium being defined when the main magnet closes this ferromagnetic circuit.

8. The device according to claim 7, including at least 2 ferromagnetic circuits, a position of equilibrium being defined when the main magnet closes one of said ferromagnetic circuits.

9. The device according to claim 1, at least one conductive coil being wound around the main magnet and/or at least one conductive coil (40) being wound around at least one portion of the magnetic circuit.

10. The device according to claim 7, at least one conductive coil being wound around at least one portion of said ferromagnetic circuit.

11. The device according to claim 1, the at least one second magnet for fixing one or more position(s) of equilibrium of the main magnet further including at least one fixed magnet interacting with the main magnet.

12. The device according to claim 1, at least one of the first magnet and the main magnet being bipolar or n-polar (n>2).

13. The device according to claim 1, including several conductive coils for transforming a variation of orientation of the main magnet into electrical energy.

14. The device according to claim 1, wherein, in a 3rd speed or frequency range, called high range, the main magnet no longer rotates, said at least one first magnet interacting directly with the at least one conductive coil, the variations of magnetic field induced in the latter being converted into electric power by the at least one conductive coil.

15. An energy recovery method including:
a)—setting at least one first magnet in movement according to a rotational or translational movement, at a first speed or frequency;
b)—setting a main magnet in rotation about an axis by said at least one first magnet, starting from at least one position(s) of equilibrium of the main magnet, defined by at least one second magnet, fixedly disposed with respect to the latter;
c)—the transformation of a variation of orientation of the main magnet into electrical energy by at least one conductive coil, wherein:
in a 1st speed or frequency range, called low range, a coupling of said at least one first magnet and of said main magnet causes the rotation of the latter from at least one position of equilibrium, the oscillations of said main magnet around said at least one position of equilibrium resulting in the creation of an electrical energy in said at least one conductive coil;

for a 2nd speed or frequency range, called mid-range, a coupling of said at least one first magnet and of said main magnet causes the rotation of the latter, without oscillations, and this rotation results in the creation of an electrical energy in the coil.

16. The energy recovery method according to claim 15, the at least one first magnet being driven in rotation at a speed lower than 120 rpm.

17. The energy recovery method according to claim 15, the at least one first magnet being driven in rotation at a speed comprised between 120 rpm and 10,000 rpm.

18. The energy recovery method according to claim 15, further including:
a step of setting said at least one first magnet, in movement at a third speed or frequency for which the main magnet is not set in rotation;
transformation of this movement of said at least one first magnet into electrical energy by said at least one conductive coil.

19. The energy recovery method according to claim 18, the at least one first magnet being driven in rotation at a speed higher than 10,000 rpm.

20. An energy recovery device including:
a)—first magnetic means, able to be set in movement according to a rotational or translational movement;
b)—a main magnet, able to be set in rotation about an axis (ZZ') by said first magnetic means;
c)—second magnetic means, fixedly disposed with respect to the first magnetic means, for determining one or more position(s) of equilibrium of the latter;
d)—at least one conductive coil for transforming a variation of orientation of the main magnet into electrical energy, wherein:
in a 1st speed or frequency range, called low range, a coupling of said first magnetic means and of said second magnetic means causes the rotation of the latter from at least one position of equilibrium, the oscillations of said main magnet around said at least one position of equilibrium resulting in the creation of an electrical energy in said at least one conductive coil;

for a 2nd speed or frequency range, called mid-range, a coupling of said first magnetic means and of said main magnet causes the rotation of the latter, without oscillations, and this rotation results in the creation of an electrical energy in the coil.

* * * * *